(No Model.)

J. J. GERARD.
DUST COLLECTOR.

No. 512,247.   Patented Jan. 2, 1894.

Witnesses
C. E. Van Doren,
F. S. Lyon

Inventor;
John J. Gerard.
By Paul Arwerwin
his Attorneys.

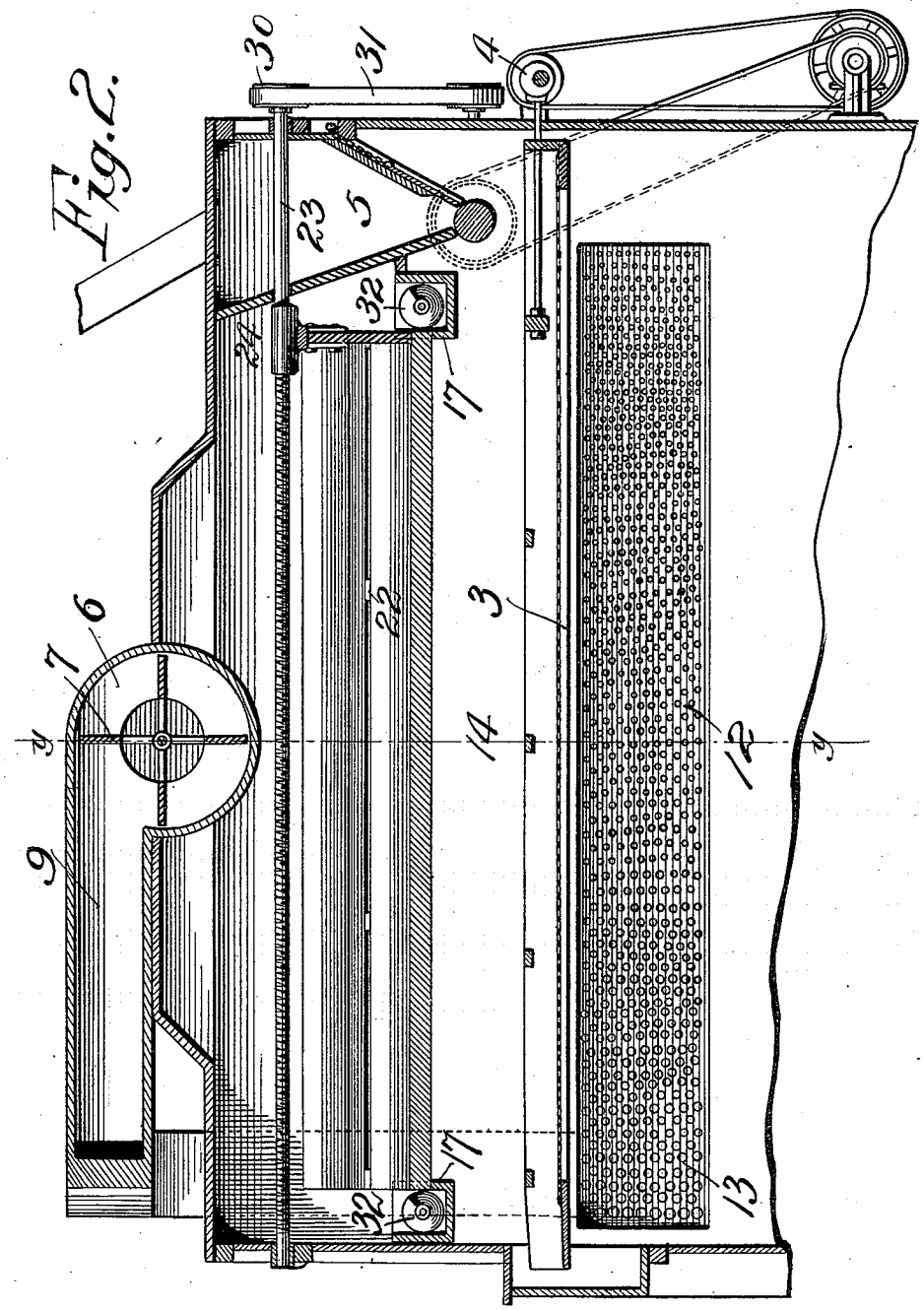

UNITED STATES PATENT OFFICE.

JOHN J. GERARD, OF MINNEAPOLIS, MINNESOTA.

DUST-COLLECTOR.

SPECIFICATION forming part of Letters Patent No. 512,247, dated January 2, 1894.

Application filed September 13, 1892. Serial No. 445,744. (No model.)

*To all whom it may concern:*

Be it known that I, JOHN J. GERARD, of Minneapolis, in the county of Hennepin and State of Minnesota, have invented certain Improvements in Dust-Collectors, of which the following is a specification.

My invention relates to means for collecting the dust from dust laden air arising from any separating device, and its object is to provide a positively acting dust collecting mechanism made up of rigid parts which will not get out of order and which may be manufactured at a very low cost.

The invention consists in the combination with a number of parallel troughs having inlet slots between them, of convex hoods arranged above said slots and adapted to direct the air currents downwardly into said troughs where the air expands and the dust is precipitated. The dust is gathered by a traveling gate which alternately moves between the walls of the machine to push the dust from the troughs into receiving hoppers arranged at the ends thereof.

The invention consists further in various details of construction and combinations all as hereinafter described and particularly pointed out in the claims.

My invention will be more readily understood by reference to the accompanying drawings, in which—

Figure 1:
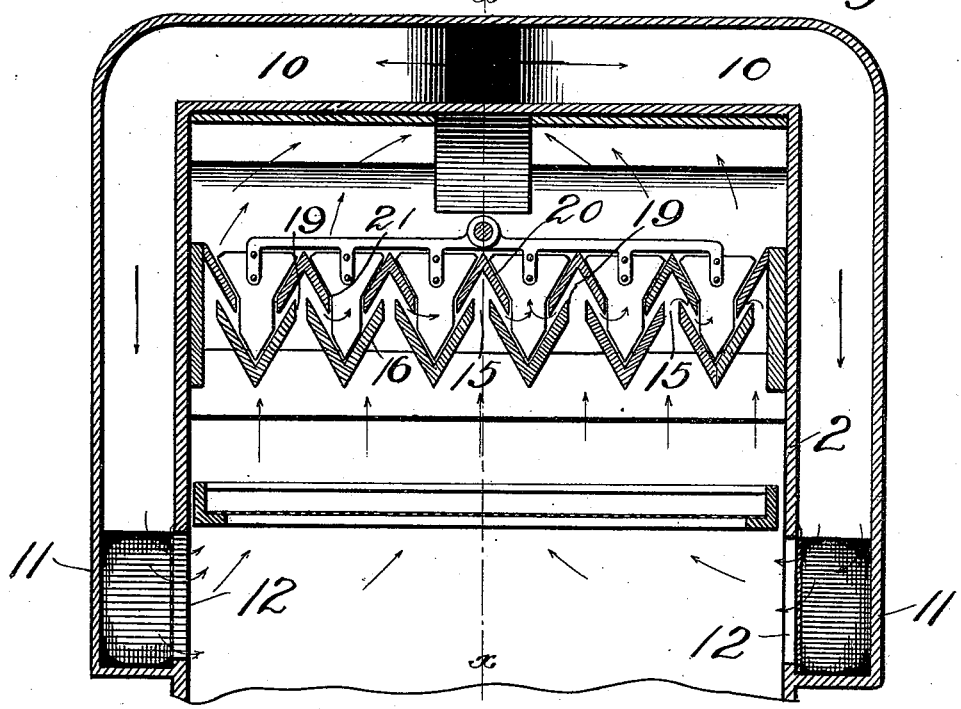
Figure 4:
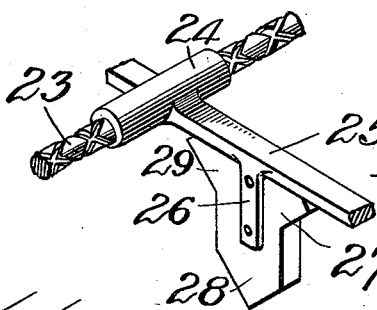
Figure 3:
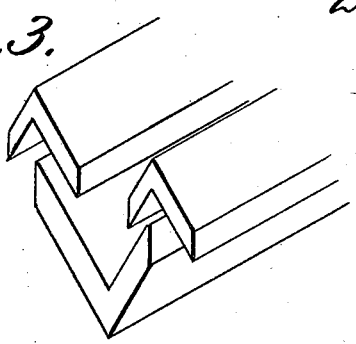

Figure 1 is a transverse vertical section of a machine embodying my invention, on the line *y—y* of Fig. 2. Fig. 2 is a longitudinal sectional elevation thereof, on the line *x—x* of Fig. 1. Fig. 3 shows one of the entering troughs and the hoods raised over the upper edges thereof. Fig. 4 is a detail showing one of the travelers or gates and the manner of connecting the same with the double screw threaded shaft of the ordinary construction.

As shown in the drawings, 2 represents the case of an ordinary purifier, and 3 the separating sieve thereof which is operated by the suitably driven cam 4 and is supplied with stock from the feed hopper 5.

In the upper part of the casing I arrange the fan casing 6 containing the fan 7 and having the discharge trunk 9, which at the rear end of the machine branches into the two ducts 10 passing down one on each side of the machine into longitudinal boxes 11 from which the air is discharged into the lower part of the casing through the perforated walls 12. It will be seen that the perforations 13 in these walls are large at the rear end and grow gradually smaller toward the forward end, the object of this construction being to proportion the air currents to the body of stock upon the sieve whereby a more thorough separation of the dust from the good stock is attained. The dust rising from the sieve into the dust-laden air chamber 14 above the same passes up through the long slots or openings 15 between the parallel V-troughs 16, which have their ends secured in the inner walls of the transverse hoppers 17, one arranged at each end of the series of troughs and the outer walls of which connect with the casing to entirely separate the chamber 14 from the upper part or free air chamber, save through said slots.

Above each of the slots 15 which, as shown, have the vertical or beveled sides 19 I arrange an inverted V-shaped hood 20, the lower edges of which overlap the upper edges of the trough 16 and form narrow ducts through which the air flows downward into the troughs. The space between the lower edges 21 of the hood is much greater than the narrow openings between the same and the sides of the troughs, so that upon entering the troughs the air expands, thus permitting the dust to drop into the same. The hoods are supported upon the troughs by small brackets 22 shown in Fig. 2. Centrally above this device I provide a double threaded shaft 23 upon which is a sleeve 24 having the usual pivoted lug (not shown) engaging said threads and provided with the transverse arms 25 having the depending lugs 26 on which I provide the blocks or gates 27 having the wedge shaped lower ends 28 to fit the bottoms of the troughs 16, and the inclined sides 29 to scrape the dust from the tops of the hoods. The shaft 23 extends through the end of the machine and is continuously driven in a single direction by a belt 31 passing over the pulley 30 on its other ends.

In each of the hoppers 17 I arrange a conveyer 32 to carry away the dust deposited therein. The traveling blocks or gates move at a slow speed, gathering the dust in the troughs and pushing it into the hopper toward which the gate is moving. Arriving at the end of the shaft the movement of the gates or traveler slowly returns to carry the dust which collected during the forward movement thereof into the other hopper 17. This construction is extremely economical as there are no pivoted parts and few metal fittings are employed, and being of a strong construction the device seldom needs repair. If desired, rubber or cloth wipers may be arranged upon the inclined edges of the traveling blocks to more closely engage the walls of the trough and clean the same thoroughly of all dust.

The principal advantage of my machine arises from the employment of the continuous air belt, the efficient method of graduating the discharge of the air into the lower part of the machine and the continuous deposit and collection of the dust.

Having thus described my invention, I claim as new and desire to secure by Letters Patent—

1. The combination with a series of parallel troughs having slots between their upper edges, of the hoods provided above said slots to deflect the air and dust into said troughs, a series of wedge shaped blocks projecting into said troughs and adapted to engage the walls thereof and the outer walls of said hoods, means for moving said blocks longitudinally, and dust receiving hoppers provided at each end of said series of troughs, substantially as described.

2. The combination with the machine casing, of the separating device arranged therein, means for continuously exhausting the air from the top of said casing and discharging it into the bottom thereof, a series of parallel troughs extending between the walls of said casing having the slots 19 between their upper edges, the hoods 20 provided above said slots and adapted to deflect the air currents into said troughs, the cross arm 25, the wedge blocks 27 arranged thereon and projecting into said troughs, means for moving said blocks back and forth in said troughs and a receiving trough or hoppers provided at the end of said series of troughs, substantially as described.

3. The combination with the machine casing, of the separating device arranged therein, the fan and casing provided in the top of said main casing, and having a duct or trunk 19, the branches 10 thereof, the longitudinal boxes 11 provided upon the sides of the casing, and the walls 12 having perforations 13 of graduated sizes, as and for the purpose specified.

4. The combination with the main casing of the machine, of the separating device arranged within said casing, the fan casing provided in the upper part of said main casing and having the trunk 9 provided with the branching ducts 10 extending down on opposites sides of the machine, the longitudinal boxes or trunks 11 connected therewith, and the walls 12 arranged on the sides of the machine between said separating device and provided with graduated perforations and the largest of the perforations being at the point beneath the discharge end of the separating device, all substantially as described and for the purpose specified.

In testimony whereof I have hereunto set my hand this 24th day of May, 1892.

JOHN J. GERARD.

In presence of—
A. C. PAUL,
FREDERICK S. LYON.